US007571222B1

(12) United States Patent
Evans et al.

(10) Patent No.: US 7,571,222 B1
(45) Date of Patent: Aug. 4, 2009

(54) NETWORK COMPONENT IDENTIFICATION

(75) Inventors: Stephen C. Evans, Aylesbury (GB); David Stuart Gordon, Howden-le-Wear (GB)

(73) Assignee: Sun Microsystems, Inc., Santa Clara, CA (US)

( * ) Notice: Subject to any disclaimer, the term of this patent is extended or adjusted under 35 U.S.C. 154(b) by 955 days.

(21) Appl. No.: 10/724,020

(22) Filed: Nov. 26, 2003

(51) Int. Cl.
*G06F 15/177* (2006.01)
(52) U.S. Cl. .................................... 709/220; 709/223
(58) Field of Classification Search ......... 709/223–229, 709/245, 220
See application file for complete search history.

(56) References Cited

U.S. PATENT DOCUMENTS

| 6,583,989 | B1 | 6/2003 | Guyer et al. | |
|---|---|---|---|---|
| 6,877,033 | B1* | 4/2005 | Garrett et al. | 709/218 |
| 2003/0023711 | A1* | 1/2003 | Parmar et al. | 709/223 |
| 2003/0030990 | A1 | 2/2003 | King | |
| 2003/0033409 | A1 | 2/2003 | King | |
| 2003/0033544 | A1 | 2/2003 | King | |
| 2003/0048613 | A1 | 3/2003 | Garnett | |
| 2003/0050998 | A1 | 3/2003 | Garnett | |
| 2003/0236824 | A1* | 12/2003 | Alsafadi et al. | 709/203 |
| 2004/0024860 | A1* | 2/2004 | Sato et al. | 709/223 |
| 2005/0027904 | A1* | 2/2005 | Khawand et al. | 710/30 |

* cited by examiner

*Primary Examiner*—Krisna Lim
(74) *Attorney, Agent, or Firm*—Meyertons, Hood, Kivlin, Kowert & Goetzel, P.C.

(57) ABSTRACT

In a computer network, an object identifier relating to the identity of a network component is generated by applying an algorithm to manufacturer's data stored in a memory associated with the component. An MIB correlating the generated object identifier and the component description is produced by applying the same algorithm to corresponding data items in a manufacturer's product database and correlating product description information with the generated object identifier data.

18 Claims, 6 Drawing Sheets

FIG. 4

| Platform ID PROM | 11 |
|---|---|
| Maker | SUN |
| Part No. | 1.4566782 |
| Serial No. | S01-002 |
| Model. | Blade Server 4. |

FIG. 5

| FRU ID PROM | 12 |
|---|---|
| Maker | 4 5 6 7 |
| Type No. | 8 9 0 1 |
| Part No. | 2 3 4 5 |
| SysObjectID | 123.456.789 |
| ⋮ | ⋮ |

| FRU ID PROM | 12 |
|---|---|
| Maker | SUN |
| Part No. | 2.7899463 |
| SERIAL No. | C01-003 |
| TYPE | MATH CARD #1 |

NETWORK COMPONENT IDENTIFICATION

BACKGROUND OF THE INVENTION

The present invention relates to the management of computer networks, and is primarily concerned with the identification of network components by a network management application.

In a computer network where numerous components are connected together, network management is carried out by a network management system which is a programme resident in one or more of the servers or "platforms", and which can communicate with the other components of the system. The tasks of the network management system include routing and managing traffic flows on the network, identifying machines connected to the network, and identifying replaceable parts fitted to machines (platforms) connected to the network.

The network management application typically uses the SNMP protocol for communicating with machines and other entities on the network. Each network component incorporates a processor running a programme referred to as an "agent" which organises the receiving of requests for data sent by the network management application, and manages the preparation and sending of responses to those requests over the network to the network management application. Each network component also has associated with it a memory containing data specific to that component, such as the manufacturer's part number, serial number, etc. This memory is typically in the form of a PROM, and is called the platform ID PROM when associated with a network platform, and a "FRU ID PROM" when it is associated with a field replaceable unit or "FRU".

Items of Information which may be required by the network management application are each identified by an "Object Identifier". An object identifier is a number constructed from a sequence of sub-numbers separated by dots. Typically there may be up to 128 sub-numbers and each sub-number may contain up to 32 binary digits. Object identifiers are organised on a tree structure, and each object identifier has a text equivalent for ease of interpretation by the user. One such object identifier is referred to as "SysObjectID", and a request for this object identifier is in effect a request for a network component to identify itself, the "SysObjectID" object identifier relating to information on the make, model, type, etc. of platform component. Another object identifier is "entPhysicalVendorType", and this object identifier relates to the identity of a "field replaceable unit" or "FRU" mounted within a platform of the network.

An essential adjunct to the network management application is the "Management Information Base" or MIB. In the MIB are stored correlations between the textual representation of each object identifier, and its number sequence. As has been previously stated, each object identifier corresponds to a piece of information relating to the network or to a component of the network. A network management application may have several MIBs associated with it, correlating specific items of information with their Object Identifier.

The "SysObjectID" object identifier is devoted to the identification of pieces of equipment, or platforms, which form the network, and each equipment manufacturer will provide an MIB listing all of his platforms and the information corresponding to each "SysObjectID" object identifier. Similarly, each FRU of a manufacturer will have its corresponding "entPhysicalVendorType" object identifier listed in a MIB, possibly the same MIB as lists the platform object identifiers. Each manufacturer has a central listing to avoid duplication of object identifiers, so that object identifiers relating to different characteristics of the same piece of equipment, or to characteristics of different items of equipment, are not described using the same numerical sequence.

In a network environment, it is common for one or more platforms (for example servers) connected to the network to have Field-Replaceable-Units or "FRUs" in the form of electronic sub-systems which can be mounted to the platform. A platform may have a number of "slots", into each of which a FRU can be mounted. Each FRU will have identifying data associated with it, usually held in an ID PROM attached to the FRU, containing identifying information such as the manufacturer's name, the vendor's name, a part number, type number, and a date of manufacture.

Current practice is for the agent to have hard-coded data, for example in the form of a table, correlating the identities of FRUs mountable to the platform with their respective "entPhysicalVendorType" object identifiers. This enables the agent, when asked to identify a FRU mounted to the platform, to interrogate the FRU to get its identity data, and then to look up the corresponding "entPhysicalVendorType" object identifier from the table stored in the agent programme. The object identifier can then be sent to the network management application. The data in the table is stored at the time of release of the platform, and is not easily updatable.

A problem arises for the network management system if the agent running on the processor of the platform, or the MIB stored in the network management application which stores details of the network components, is of an earlier release date than a FRU mounted in the platform of the network. For example, a newly-released FRU may be mounted in a network platform which is some months or years old. In such a case, when the network management application requests the agent in the platform to identify the FRU mounted in a particular slot of the platform by supplying its "entPhysicalVendorType" object identifier, the agent may retrieve identity information from the FRU ID prom, but may not be able to supply an object identifier to the network management application, because the agent's table does not include an object identifier corresponding to that data identity information. This difficulty is only overcome by the simultaneous updating of agent programs in existing networks with each new equipment release, as well as updating of the MIB files held by the network management system. This constant revision of MIB files and agents is costly and requires extensive use of human and machine resources.

SUMMARY OF THE INVENTION

An aspect of the present invention provides a software agent which can generate an Object Identifier corresponding to an item of information requested by a network management application, on the basis of other information stored on an ID PROM of a network component such as a platform or FRU. The Object Identifier may be the "sysObjectID" of a platform on which the agent program is running, or may be an "entPhysicalVendorType" object identifier of a FRU mounted to the platform. The other information may be all or part of the manufacturer's part number or type number, for example of the platform or FRU. The agent may generate the object identifier by taking the data from the ID PROM and adding a prefix to it.

Another aspect of the invention provides a method of managing a computer network wherein a network management application resident in one or more locations on the network is operable to request information from network platforms by requesting Object Identifiers from agents running on the platforms, and wherein an agent associated with a platform is operable to generate a response to such a request by applying an algorithm to an item of data stored on the platform or on a FRU mounted to the platform to produce the requested Object Identifier. The requested Object Identifier is then compared with a list of Object Identifiers stored in a table, to retrieve identification data relating to the platform or FRU.

The item of data to which the agent applies the algorithm may be stored in a memory associated with or attached to the platform or FRU respectively. Alternatively, the data may be hard coded in the circuitry of the platform or FRU.

Another aspect of the invention provides for a network management application and method wherein the management application requests an agent program running on a network platform to provide manufacturer's data from a memory associated with the platform or with a FRU mounted to the platform, and when said data is provided the management application applies an algorithm to the data to generate an Object Identifier corresponding to the platform or to the FRU, respectively.

A data storage medium or a signal carrying machine-readable instructions for carrying out the method of the invention, either in the form of a network management application or in the form of an agent to be run on a network platform, is provided as a further aspect of the invention.

A platform including a processor programmed with an agent, and a computer network platform including a processor programmed with the network management application, are provided in further aspects of the invention.

Further aspects of the invention will become apparent from the following description of embodiments of the invention.

BRIEF DESCRIPTION OF THE DRAWINGS

Embodiments of the present invention will now be described in detail with reference to the accompanying drawings, in which corresponding elements are given like reference numbers. In the drawings:

FIG. 4 illustrates the information typically stored in a platform ID prom;

FIG. 5 shows the data structure of a FRU ID prom in an embodiment of the present invention;

FIG. 1 schematically illustrates a computer network comprising a number of server units 1 and a number of network terminals 2 connected by a network 3. The exact nature of the network 3 is immaterial, provided that it supports communication between the server units 1 and network terminals 2. A preferred protocol for communication between the server units and network terminals is the SNMB protocol.

Figure 1:
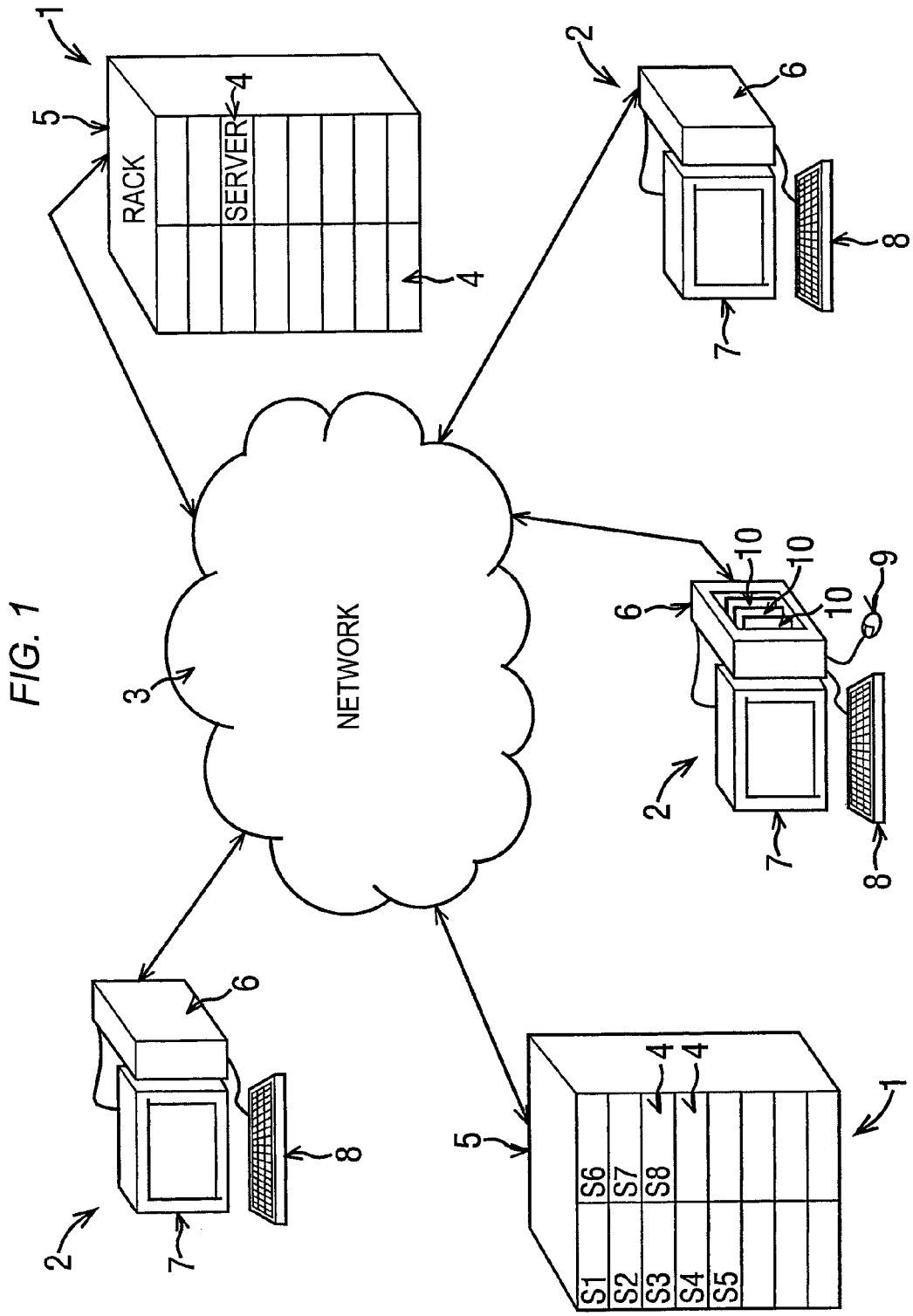
FIG. 1 is a schematic view of a computer network.

Each server unit 1 may comprise a plurality of individual servers 4 mounted in a housing or rack 5. The servers 4 mounted in a rack 5 may be similar to or different from each other, with particular servers operating to provide the network with differing capabilities such as processing, memory etc.

Each network terminal 2 may comprise a processing unit 6 connected to a display device 7 such as a monitor screen, and to input devices such as a keyboard 8 and/or a mouse 9.

The processing unit 6 of a network terminal 2, and/or one or more of the servers 4 in one or more of the server units 1 may have slots into which FRUs can be inserted to provide additional functionality to the processing unit 6 or to the server 4 respectively. In FIG. 1, the central (in the Figure) network terminal 2 is shown with three FRUs 10 mounted in its processing unit 6.

Figure 2:
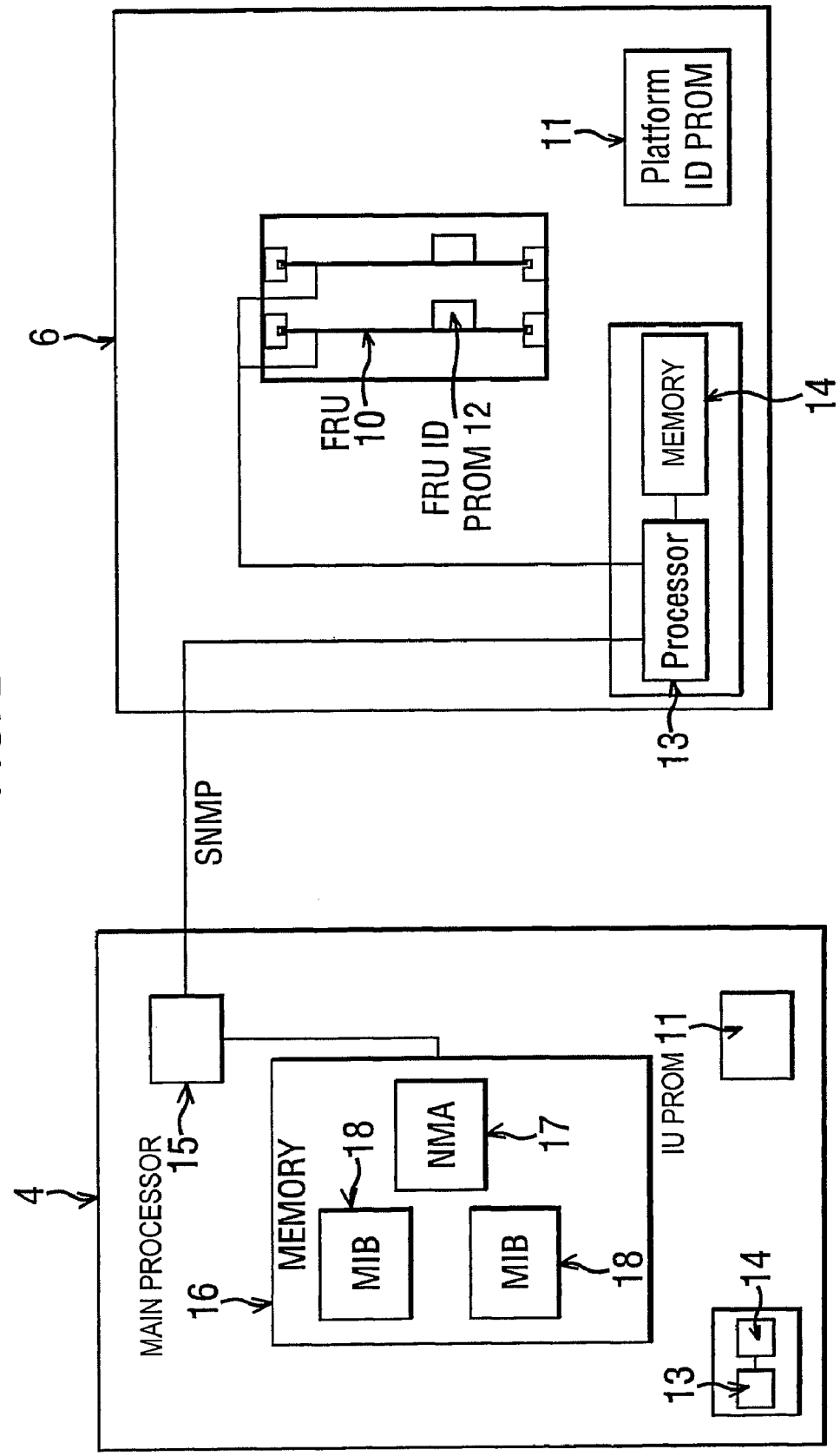
FIG. 2 is a schematic view showing the connection between a network management software and a network platform containing FRUs.

As can be seen from FIG. 2, each of the components attached to the network 3, i.e. each server 4 and each processing unit 6, has attached to it a "platform ID" prom 11, containing information which identifies the respective component or "platform". Likewise, each FRU 10 has attached thereto a "FRU ID" prom 12 to identify the type and nature of the circuitry contained in the FRU.

Each platform attached to the network, be it a server 4 or a processing unit 6, includes a processor 13 associated with a memory 14. The memory 14 stores an "agent" programme one of whose functions is to interrogate the ID proms 11 and 12 of the platform 6 and any FRU 10 mounted thereto, in response to information requests made to the processor 13.

One of the network platforms, typically a server 4 as is shown in FIG. 2, will include in addition to its platform ID prom 11 and its processor 13 and associated memory 14, a main processor 15, with which is associated memory 16 on which is stored the network management programme 17 and one or more MIBs 18.

Figure 3:
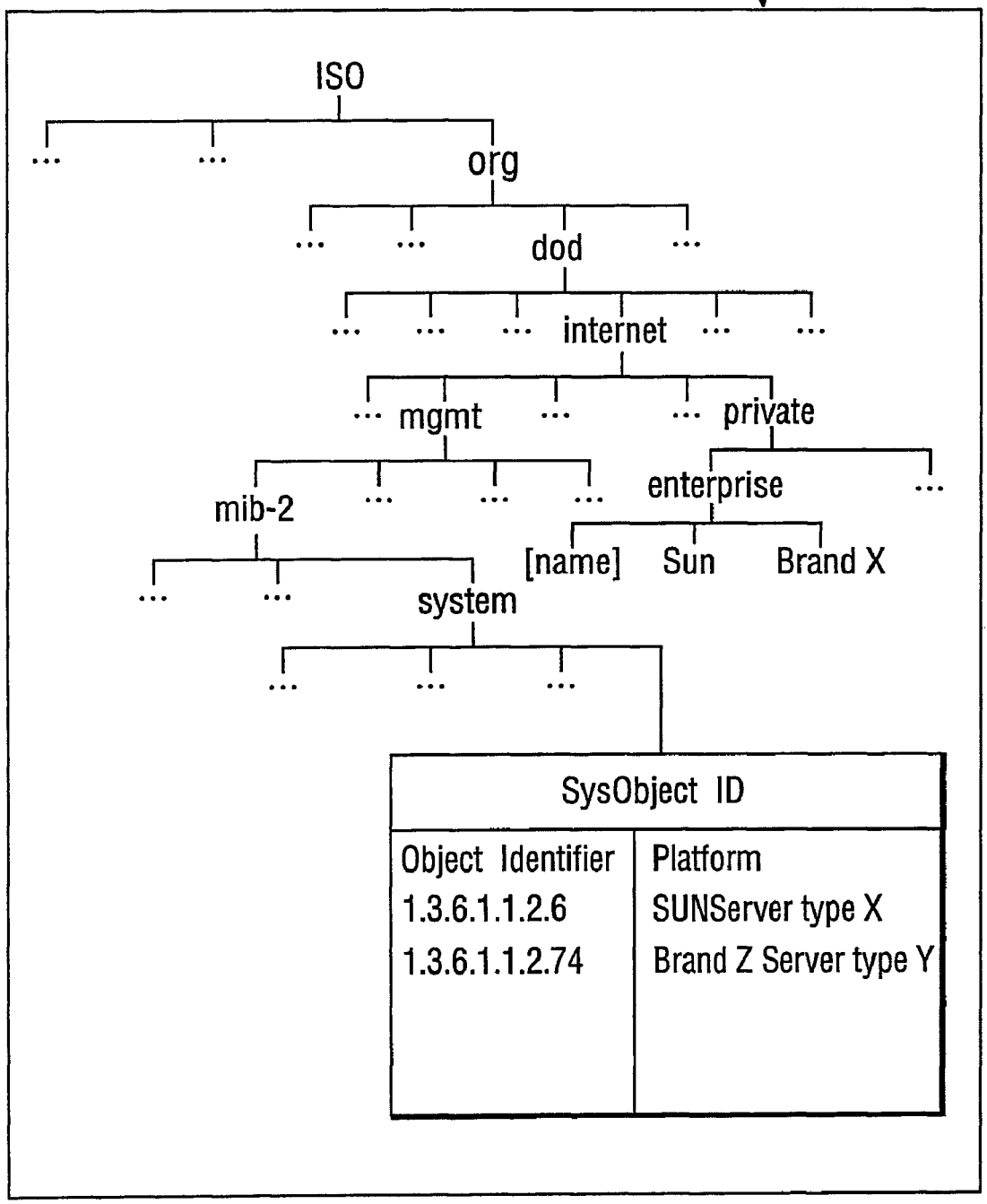
FIG. 3 partially illustrates the data stored in of a management information base (MIB)
Figures 6, 7:
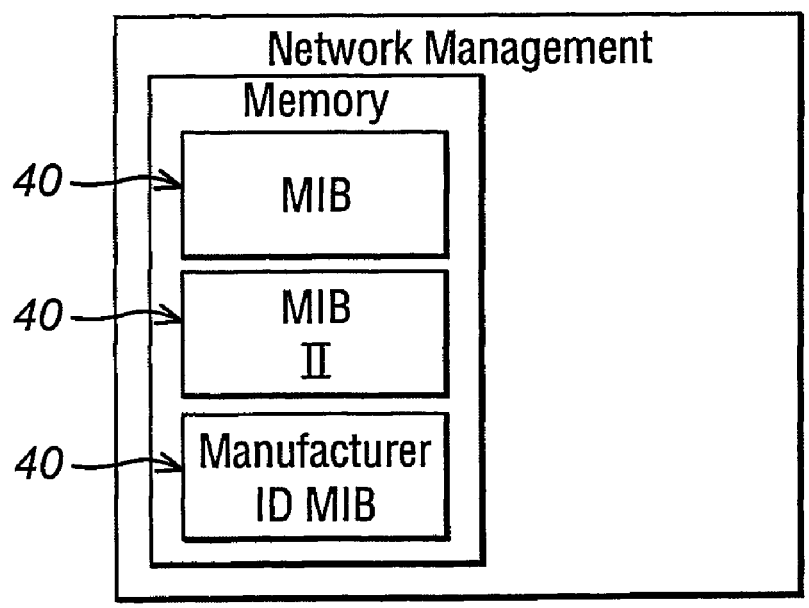
FIG. 6 shows the data structure of a FRU ID prom in an embodiment of the present invention.
FIG. 7 schematically illustrates a plurality of MIBs in a network management system.

FIG. 3 illustrates part of the data stored in a MIB 40. In this case the MIB stores, among other data, a correlation between the numerical code of the "SysObjectID" object identifier and a description of the manufacturer, type and model of the equipment to which the Object Identifier relates. The hierarchical structure used in MIBs is determined by the Internet Engineering Task Force and is accessible on www.ietf.org is not directly relevant to the present invention, since the present invention requires the MIB only to provide a correlation between the sysObjectID and entPhysicalVendorType object identifiers and the descriptions of the equipment to which those object identifiers relate. For an explanation of the naming hierarchy used in a MIB, the reader is referred to Section 4 of RFC2578 which can be found at [world.wide.web].faqs.org/rfcs/rfc2578.html) or on the ietf site referred to above. Section 3.5 of RFC2578 further provides a definition of an Object Identifier.

Typically, a "sysObjectID" object identifier consists of a series of sub-identifiers each corresponding to a level on a hierarchical address tree. Expressed in words, the object identifier is "iso.org.dod.internet.mgmt.mib-2.system.sysObjectID" and expressed numerically 1.3.6.1.1.2. This identifies a data space wherein sysObjectID object identifiers are correlated to descriptions of their associated hardware. FIG. 3 illustrates such a hierarchy structure.

FIG. 4 shows the data stored in the ID PROM which is attached to each platform or FRU. Conventionally the manufacturer information such as date of manufacture, maker's name and plant location, part and/or type number, and vendor name is stored in the ID PROM. The data stored in the ID PROM is standardised, in that each ID PROM carries the same data items in an industry-standard format.

One function of the network management programme 17 is to identify platforms and FRUs which are connected to the network. In order to carry out this function, the network management programme 17 sends requests over the network to each platform agent, requesting an object identifier "SysObjectID" from the platform. In the ID PROM of each platform and each FRU, the identity data relating to the particular hardware item is stored. When a platform agent receives a request for the SysObjectID of a platform, the agent programme 14 reads the identity data from the ID PROM of the platform and maps the identity data to the required object identifier, by looking up the object identifier corresponding to the read identity data in a correlation table associated with the agent program. The agent then replies to the request by sending the SysObjectID object identifier code to the network management programme. The network management programme then refers to its MIB to identify the hardware item associated with the SysObjectID object identifier code, and can then display the description of the item whose SysObjectID corresponds to that code to, for example, a network user.

When a platform has a plurality of slots for the mounting of FRUs to the platform, the agent programme for that platform is written to include means to retrieve identity data from a FRU mounted in a selected slot of the platform. The selection information is contained in the request from the network management programme.

When the network management system of FIG. 2 requires identifying data relating to the FRU 10 mounted in platform 6, the request is sent by processor 15 to processor 13 of the platform 6. The ID PROM 12 of FRU 10 is interrogated to retrieve the identity data, and the agent then maps this to a corresponding "entPhysicalVendorType" object identifier sequence 123.456.789 and this sequence is sent to the network management system by the platform processor 13. On receipt of the "entPhysicalVendorType" object identifier sequence 123.456.789 the network management system retrieves from the MIB 18 the description "SUN FRU #1" (FIG. 3) and this is, for example, displayed to a user to indicate the nature of the FRU 11.

In order that the network management programme can accurately identify all of the components attached to the network, both the correlation table of the agent and the program and the MIB must be constantly updated to include the object identifier information and corresponding description of any newly-released hardware. For example, if a newly-released FRU 10 is mounted to a platform 6, agent program will not be able to map identity data to an entPhysicalVendorType object identifier, and the network management programme 17 will not be able to identify that FRU 10 until the MIB 18 of the network management programme 17 is updated to include the entPhysicalVendorType object identifier information and corresponding description of the newly-released FRU 10.

In the conventional system, the object identifiers are agreed in advance of the release of the new component with an industry organisation which oversees the allocation of the number codes to avoid duplication. Furthermore, an updated MIB and correlation tables for agent programs must be released each time a new component is made available, so that any system on which the new component is installed may readily identify the new component.

This need for prior arrangement of the SysObjectID code can delay the release of components, and the need to issue multiple updates of the MIB information is a costly burden on a manufacturer.

A manufacturer may however register its own dataspace within the hierarchy shown in FIG. 3, typically with the identifier sequence "iso.org.dod.internet.private.enterprise [name]", where [name] is the manufacturer's name. This may be further subdivided by the addition of more sub-identifiers after the manufacturer's name. The allocation of object identifiers within the manufacturer's "branch" (i.e. after the "name" sub-identifier) is controlled by the manufacturer, and can contain sysObjectID object identifiers allocated specifically by the manufacturer and relating to its products. FIG. 3 shows two such branches, one for the manufacturer "SUN" and one for the manufacturer "Brand X".

When a manufacturer using this naming protocol develops a new platform, the manufacturer allocates a sysObject ID to the platform and records it in its registered data space. In practice, any FRU compatible with the manufacturer's platform will have been developed either solely by the platform manufacturer, or in collaboration with him. The platform manufacturer will supervise the allocation of part or type numbers, and entPhysicalVendorType object identifiers to such FRU's to identify each FRU, avoiding duplication. This data is recorded in the manufacturer's dataspace, so that a unique object identifier sequence can be provided for each FRU type compatible with the platform, irrespective of the FRU manufacturer.

One embodiment of the present invention provides an agent programme for installation in the memory 14 of a network platform, to enable the processor 13 of the network platform to communicate with the platform ID PROM 11 and/or a FRU ID PROM 12 of a FRU 10 mounted to the platform 6, in order to generate an object identifier code on the basis of other information stored in the platform or FRU ID PROM. The network components are the same as those illustrated in FIG. 1; the invention is embodied in the software programmes and data files stored in the various components.

The agent programme is installed in the memory 14 of the network platform, as before, but operates in a different way in response to an object identifier request received from the network management application. Instead of simply reading identifying data from the ID PROM of the platform or FRU whose identity is required and looking in a correlation table, the agent programme reads for example a 7 digit manufacturer's part number from the platform or FRU ID PROM and uses this data to generate the required object identifier.

The agent programme may be arranged to retrieve more than one data item from the ID PROM in order to generate the object identifier sequence. For example the agent may retrieve two or more of the manufacturer name data, model type data, or component serial number data, or any other identifying information held in the ID PROM in order to generate the object identifier sequence.

The agent programme may add a prefix or suffix to the generated sequence to the complete object identifier sequence, this prefix or suffix having been inserted into the agent programme when it was written to run on a particular platform. The agent programme may retrieve one or more data items from the platform or FRU ID PROM and generate part of the object identifier by applying an algorithm to the retrieved information, and then combine the generated part of the object identifier with a pre-stored part, such as a prefix, held in the memory associated with the agent programme as part of the programme data.

When the agent has responded to the request by returning the SysObjectID or entPhysicalVendorType number sequence to the network management system, the network management system retrieves from its MIB 40 the description of the equipment corresponding to that numerical sequence and, for example, displays to the user the identity information. The network management system may, of course, make other use of the retrieved identity data.

In a first example of the invention, the network is as illustrated in FIG. 2 with the difference that the data stored in the platform ID PROM 11 is as shown in FIG. 4, and the data stored in the FRU ID PROM 12 is as shown in FIG. 5. The network management system will include a MIB 40 correlating the products of a manufacturer with their respective object identifier sequences, as seen in FIG. 8.

The network management system requests identifying data regarding the FRU 10, and the agent running on the platform processor retrieves from the FRU ID PROM 12 the data "2.7899463" relating to the manufacturer's part number of the FRU card.

The agent then applies an algorithm to this data to generate an entPhysicalVendorType object identifier sequence such as 1.3.6.1.14.7.42.2.7899463, and sends the sequence to the network management system. In this example, the agent adds the prefix "1.3.6.1.14.7.42" to the part number, to produce an address in the MIB hierarchy (1.3.6.1.14.7.42.2) corresponding to the manufacturer's table correlating FRU descriptions with entPhysicalVendorType object identifiers, and a part number to be looked up in the table.

Figure 8:
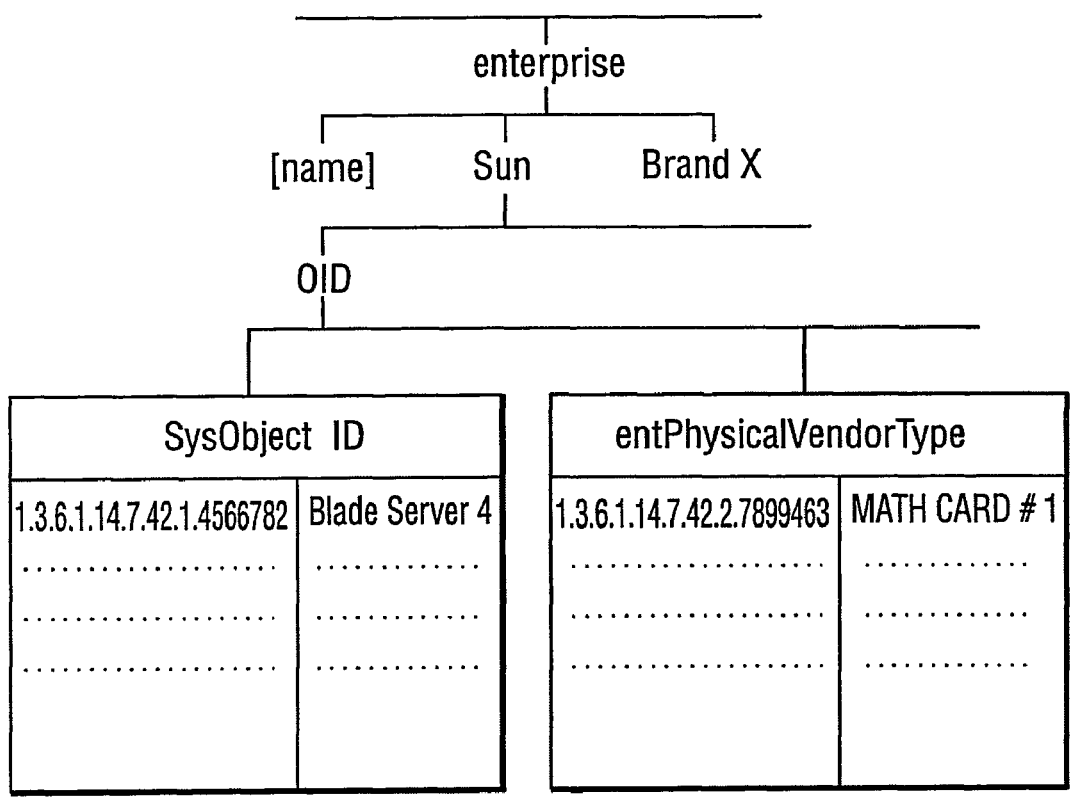
FIG. 8 illustrates the data structure of a particular MIB relating to a manufacturer's products.

The network management system then compares the entPhysicalVendorType sequence with those stored in the manufacturer's ID MIB of FIG. 8, and retrieves the corresponding description "MATH CARD #1", which may then be sent for display.

If the network management system requests the platform identity from the agent, the agent reads the part number 1.4566782" form the platform ID PROM, and applies its algorithm (in this case adding the prefix) to produce the object identifier "1.3.6.1.14.7.42.1.4566782", which the agent sends to the management system. The object identifier is looked up by the management program in a table correlating SysObjectID object identifiers with platform descriptions, to identify the platform as a "Blade server 4" unit. Again the object identifier includes an address in the hierarchy (1.3.6.1.14.7.42.1) for this correlation table, and a number to be looked up in the table.

In a second example of the invention, the agent program may retrieve one or more data items from a FRU ID prom or from a platform ID prom such as a part number and a model type number, and apply an algorithm to the two or more data items to generate the numerical entPhysicalVendorType or SysObjectID sequence respectively.

In a yet further example, the agent program may add a prefix and/or suffix to the generated object identifier sequence prior to sending the sequence to the network management system.

In a further embodiment of the invention, the platform or FRU ID prom contains the entire numerical code of the "SysObjectID" object identifier associated with the device to which the ID Prom is attached.

The necessary data tables to be written to the MIB in order to enable the network management system to identify the equipment may be easily compiled from the existing manufacturer's part and type information data by applying the same algorithms to the same data items as are retrieved from the ID Prom. An updated MIB for all of a manufacturer's products can thus be easily generated from the existing database of part numbers, model numbers and equipment descriptions held by the manufacturer. Since each piece of equipment is given a unique model or part number, then applying the same algorithm as is used in the agent programme, and adding the same prefix if necessary, will generate a SysObjectID or entPhysicalVendorType sequence unique to that piece of equipment. The MIB may then be compiled by storing the description of the equipment and its corresponding SysObjectID sequence. Compilation of the MIB may be automated, and since the manufacturer's database will, at any time, include details of all equipment currently offered by the manufacturer the resulting MIB will always be up to date.

The part numbers may comprise two sub-identifiers of the object identifier, as in the examples given above, or may comprise one or more than two sub-identifiers separated by appropriate symbols (in the examples, full stops). For example platforms may have part numbers in the form "1.xxxxx" and FRUs may have part numbers in the form "2.xxxxx" so that, when the prefix is added by the agent, the resulting object identifiers address separate tables in the MIB. Alternatively, all part numbers may be in a single table and may comprise one sub-identifier only.

The invention claimed is:

1. A method comprising: generating identification information identifying a network component connected to a computer network, the network component having a memory storing a first set of data items relating to the network component, said generating comprising the network component retrieving one or more of said first set of data items from said memory and generating said identification information from said retrieved data items.

2. A method according to claim 1 wherein said identification information is generated in a first network component in response to a request from a network management application program running in a second network component.

3. A method according to claim 1 wherein the method further comprises retrieving further data from a further memory associated with said first network component or with another network component, and adding said further data as a suffix or prefix to said retrieved data to generate said identifying information.

4. A method according to claim 2 wherein said generated identification information is sent from said first network component to said second network component.

5. A method according to claim 1 wherein said memory is an ID PROM, and said first set of data items includes at least one of a manufacturer's part number, a serial number, and an equipment type descriptor.

6. A computer network comprising:
   a first network component coupled to the computer network, the first network component including a memory;
   a second network component coupled to the computer network, wherein the second network component is configured to perform a network management application, wherein performing the network management application includes sending a request for identification information to the first network component;
   wherein the first network component is configured to, responsive to receiving the request, retrieve one or more data items from a set of data items stored in the memory, generate said identification information from said retrieved data items, and send said generated identification information to said second network component via said computer network, wherein said identification information identifies the first network component.

7. A method comprising: operating a computer network including a first network component and a second network component linked to the first network component by a communication network, the second network component being operable to perform a network management application wherein a request for identification information identifying the first network component is sent via the communications network to the first network component, and wherein the first network component provides identification information in response to such a request by retrieving one or more data items from a first set of data items stored in a memory of said first network component, generating said identification information from said retrieved data items, and sending said generated identification information to said second network component via said communications network.

8. A method according to claim 7, wherein the step of generating said identification information comprises adding said retrieved data item or items as a suffix or prefix to data items stored in a further memory of said first network component.

9. A method according to claim 7, wherein said first network component is a sub-system of a third network component, and the step of generating said identification information comprises adding said retrieved data item or items as a suffix or prefix to data items stored in a memory of said third network component.

10. A method according to claim 7, wherein said first set of data items comprises at least one of a manufacturer's part number, a type descriptor, and a serial number.

11. A method according to claim 7, wherein said memory associated with said first network component comprises an ID PROM.

12. A method according to claim 7, wherein identification information received by the second network component is compared with management information data stored in a memory in said second network component.

13. A method according to claim 7 further comprising extracting from a database of product information data corresponding to a description of an item of equipment and data corresponding to said first data items relating to said equipment, generating identifying information from said first data items, and storing a correlation between said generated identifying information and said data corresponding to said description.

14. A computer network component comprising: a processor; and a memory wherein the memory stores instructions executable by the processor to generate identification information identifying the computer network component, the computer network component having a memory storing a first set of data items relating to the computer network component, said generating comprising the computer network component retrieving one or more of said first set of data items from said memory and generating said identification information from said retrieved data items.

15. The computer network component according to claim 14, wherein said memory is an ID PROM, and said first set of data items includes at least one of a manufacturer's part number, a serial number, and an equipment type descriptor.

16. The computer network component according to claim 14, wherein the computer network component is configured to generate said identification information responsive to a request from a network management application running on another component connected to said computer network.

17. The computer network as recited in claim 16, wherein the second network component is configured to compare identification information received from the first network component with management information data stored in a memory of said second network component.

18. The computer network as recited in claim 6, wherein said memory is an ID PROM, and said set of data items includes at least one of a manufacturer's part number, a serial number, and an equipment type descriptor of the first network component.

* * * * *